United States Patent Office 2,852,403
Patented Sept. 16, 1958

2,852,403

CELLULOSE MIXED ESTER COATING COMPOSITION

Luther L. Yaeger, Madison, Wis., assignor, by mesne assignments, to American Motors Corporation, Kenosha, Wis., a corporation of Maryland No Drawing. Application December 28, 1955
Serial No. 555,771

3 Claims. (Cl. 106—178)

This invention relates to chemical compositions comprising a cellulose mixed ester, and it includes coating compositions for improving the surface properties of plastics.

Heretofore it has been difficult to consistently obtain a good adhesion between polystyrene and such resistant coatings as are applied thereto, as pointed out in Patent 2,578,665 and Patent Re. 23,753 and in co-pending patent application, Serial No. 308,304, now abandoned, filed September 6, 1952, of which the present application is a continuation in part. While reference is made herein specifically to cellulose acetyl butyrate resin, this is done by way of illustration only, and not in any sense of limitation, it being fully understood that other mixed cellulose esters may also be employed for the purpose of this invention, as will be further specified below.

An object of the invention is to so improve the surface properties of polystyrene type plastics in such manner as to enhance the value of said plastics and to greatly increase their utility.

An object of this invention is to provide new and improved protective surface coatings, which will show a consistently good adhesion to polystyrene type plastics.

Another object is to provide new and improved coating compositions for polystyrene type plastics.

Further objects will become apparent as the following detailed description proceeds:

In accordance with my invention I employ for the purpose herein set forth, as the solid cellulosic constituent of the coating composition, a mixed cellulose ester which has a hydroxyl content lower than about 1.8% and, preferably, lower than .9%.

The following experiments illustrate the influence of the hydroxyl group on the bonding properties of such coatings. The parts listed are by weight.

EXAMPLE 1

| | Parts |
|---|---|
| Ethylene glycol monomethyl ether | 50 |
| Diacetone alcohol | 30 |
| Ethylene glycol monoethyl ether acetate | 15 |

91% of the above composition was intermixed with 9% of the different cellulose acetyl butyrates tabulated below. The compositions thus obtained were agitated at room temperature until completely homogeneous, and then applied to polystyrene panels by dipping, and dried under infra-red bulbs at a surface temperature of 130° C. with good air circulation. In 10 minutes it had obtained a degree of hardness closely approximating final hardness. Adhesion of the polystyrene panels thus treated was tested by pressing an adhesive tape to said panels and withdrawing it rapidly, with a jerk. In the case where the surface coating adhered, forming an integral bond, which could not be broken by this adhesive tape test, nor scratched away with a pointed metallic instrument, it was considered that good bond existed.

The results are tabulated below:

| Cellulose Ester Composition | | | Viscosity of Cellulose Ester (ASTM Method) D-871-46T | Bond to Styrene Composition |
|---|---|---|---|---|
| Percent Acetyl | Percent Butyryl | Percent Hydroxyl | | |
| 5–7 | 47–50 | .6 | 10 | Excellent. |
| 13.5 | 36.5 | 2.0 | 25 | None. |
| 20.5 | 26.5 | 2.7 | 4 | Do. |
| 31. | 17. | .4 | 3 | Excellent. |
| 31. | 17. | .4 | 15 | Do. |
| 31. | 17. | .4 | 50 | Do. |
| 35.7 | 8. | 2.0 | 187 | None. |
| 35.5 | 8. | .6 | 30 | Excellent. |
| 6. | 48.3 | .8 | 15 | Do. |
| 24. | 25. | 1.2 | 9 | Not quite perfect. |
| 28.5 | 19. | .9 | 10 | Excellent. |
| 15.5 | 35. | 1.8 | 15 | Fair. |
| Propionyl | | | | |
| 24. | 20. | .9 | 12 | Excellent. |
| 29. | 15. | 1.85 | 30 | Fair. |
| 3. | 45. | 2.5 | 5 | None. |
| 6–8 | 48.4 | .1 | 13 | Excellent. |

Other polystyrene panels were lined up against a solid background and were then sprayed with the composition of this example, so that a uniform, even coating of the composition was poured on the panels. These panels were then dried in air under infra-red lamps, giving a temperature at the drying surface of 125° F. After that time the adhesion tests were made in the manner as stated above, and the results were as shown in the last column of the above table.

EXAMPLE 2

A composition was made of the following ingredients:

| | Parts |
|---|---|
| Ethylene glycol monomethyl ether | 50 |
| Diacetone alcohol | 30 |
| Nitromethane | 10 |
| Ethylene glycol monoethyl ether acetate | 10 |

EXAMPLE 3

Similar results are obtained with the cellulose derivatives of Example 1 dissolved in each of the four following solvent compositions:

Composition 1

5% acetone
5% toluene
10% ethyl acetate
5% nitro ethane
10% nitro methane
10% ethanol
10% butanol
20% butyl lactate
5% ethylene glycol monoethyl ether
20% ethylene glycol monomethyl ether

Composition 2

4% nitro ethane
8% butanol
4% ethyl lactate
24% diacetone alcohol
20% ethylene glycol monomethyl ether acetate
40% ethylene glycol monomethyl ether

Composition 3

- 20% methyl acetate
- 5% nitro ethane
- 5% methyl lactate or ethyl lactate
- 10% methanol
- 5% butanol
- 25% diacetone alcohol
- 30% ethylene glycol monomethyl ether

Composition 4

- 15% acetone
- 15% ethyl acetate
- 20% nitro methane
- 11% ethanol
- 5% butyl lactate
- 34% ethylene glycol monomethyl ether While in the above examples reference has been made to certain specific embodiments of the invention, it will be obvious to those skilled in the art that substantial modifications therefrom can be made without departing from the spirit or scope of the invention. For instance, while reference has been made above, by way of example and not of limitation, to polystyrene, it is fully understood that the same will apply also to such other plastic combinations as have substantially the surface characteristics of polystyrene. These include co-polymers of polystyrene with other ingredients, such as acrylonitrile, methacrylates, etc., where the polystyrene is the type of ingredient preponderantly determining surface characteristics displayed, even though not necessarily the ingredient present in the major proportion. Futhermore, I may apply in the present invention dichloro polystyrene, isopropyl polystyrene, and other analogous compositions.

The mode of application of the coating compositions to the surface to be coated is irrelevant to the invention, since any means by which the liquid composition is applied uniformly to the surface to be treated can obviously be used for the purposes of the invention.

Resinous polymers of acrylic and methacrylic acids, their esters, and co-polymers thereof may be included in the compositions, as disclosed in Patent 2,578,665. A usable composition contains from one to 49% of said polymers. These resinous polymers (acrylate resins) are particularly useful in improving the bond of the cellulose mixed ester in the higher hydroxy percentages.

With reference to the mode of drying, I find it preferable to dry at a temperature higher than room temperature, both to speed operations and to avoid "blushing," and obviously at a temperature lower than the distortion point of the particular plastic used as the base material. Instead of cellulose acetyl butyrates, I may employ, also, other cellulose esters such as cellulose formyl butyrate, cellulose acetyl propionate, cellulose formyl acetate, cellulose propyl hexionate, cellulose hexyl propionate, and cellulose butyl propionate. The ranges stated above apply also to these mixed esters; with hydroxyl content less than about .9% a perfect bond is obtainable; with hydroxyl content .9% to 1.8% the bond was sometimes very good, but sometimes spotty, and in the latter range some uncertainty in results would prevail. At hydroxyl contents above about 2%, which is a common range for commercial mixed cellulose esters, no bond was obtained.

Obviously, the presence or absence of additional or other ingredients either in the base material or in the coating compositions or coatings is not of the essence of the invention, and the invention will not be avoided or circumvented by the inclusion of such materials which do not interfere with the main function disclosed and still perform some useful function. Such permissible additional material includes, for example, ultraviolet screening agents, plasticizers, pigments, dyestuffs, odorants and deodorants, bleaching agents, and the like. The term, "acrylate resins," as used in the specification means the resinous polymers of acrylic acid, acrylic acid esters such as methyl, ethyl, propyl and butyl acrylates, and esters of methacrylic acid such as methyl, ethyl, propyl and butyl methacrylates.

The cellulose acetyl butyrate and other materials to be deposited as coating are dissolved in solvent compositions which are not as critical in nature as those set forth, for example, in Patent 2,578,665, by reason of the adherence which results from the low hydroxyl content in the cellulose aceto butyrate. In addition to the solvent formulations shown in the examples, suggested ranges of percentage for certain groups of solvents are as follows:

Aliphatic ketones and esters, toluene, and nitro-aliphatic substances other than nitro-methane having a boiling range below 120° C.: 1 to 75%; nitro-methane, aliphatic alcohols and lactates having less than 6 carbon atoms: 2 to 75%; diacetone alcohol, lactates having from 5 to 10 carbon atoms, glycol ethers and esters: 14 to 97%.

The percentages are given merely as guides since in view of the adherence resulting from the hydroxyl content of less than .9% to 1.8% in the cellulose aceto butyrate, the solvent composition may be varied outside this range. Because of the great flexibility of this type of solvent formulation, it is not possible to state absolute ranges. When modifying solvent compositions, better results may often be obtained if the balance between polystyrene solvents and polystyrene non-solvents is maintained. For example, if the coating composition is turbid, the percentage of ketone type solvent or of glycol, either ester may be increased, and likewise if the bond of the coating to the polystyrene is poor. If, on the other hand, the polystyrene surface is etched by the coating composition, then the percentage of those solvents just mentioned may be reduced in favor of nitromethane, lower aliphatic alcohols, lactates and ethylene glycol monomethyl ester, or hydrocarbon non-solvents such as aliphatic petroleum fractions, e. g. kerosene, or of combinations of these, or other solvents having similar solvent and volatility characteristics. As illustrative of the variety of solvent composition which may be used, however, because of the use of cellulose aceto butyrate as above described, any one of the three groups of solvents listed above may be omitted, and, if desired, a suitable mixture may consist, for example, of 50% n-butanol and 50% acetone.

Although solvent compositions such as those described in Examples 1 to 3, all of which fall within the ranges set forth have generally been found preferable, good results have also been achieved with each of the following seven compositions which do not fall within those ranges:

Composition 5

| | Parts |
|---|---|
| Methyl ethyl ketone | 70 |
| Methanol | 10 |
| Butanol | 14 |
| Isobutyl acetate | 6 |

Composition 6

| | |
|---|---|
| Nitromethane | 60 |
| Methanol | 10 |
| Methyl isobutyl ketone | 30 |

Composition 7

| | |
|---|---|
| Acetone | 40 |
| Butyl lactate | 20 |
| Isopropanol | 20 |
| Heptane | 20 |

Composition 8

| | |
|---|---|
| Tetrahydrofuran | 35 |
| Diacetone alcohol | 25 |
| Isopropanol | 40 |

Composition 9

| | Parts |
|---|---|
| Diacetone alcohol | 20 |
| Dioxane | 30 |
| Ethylene glycol monoethyl ether acetate | 10 |
| Methanol | 40 |

Composition 10

| | Parts |
|---|---|
| Dimethyl carbonate | 20 |
| Butyl lactate | 15 |
| Diisobutyl ketone | 15 |
| Acetone | 20 |
| Hexane | 30 |

Composition 11

| | Parts |
|---|---|
| Benzol | 35 |
| Cyclohexanone | 10 |
| Diacetone alcohol | 25 |
| Nitroethane | 30 |

Although a solvent mixture as described is generally preferable, it is often found suitable to use a single solvent or solvent pair such as one of the following (the first three can be used in lacquers for silk screening where extremely slow drying is required):

| | Percent |
|---|---|
| (1) Butyl lactate | 100 |
| (2) Diacetone alcohol | 100 |
| (3) Diacetone alcohol | 60 |
|     Ethylene glycol monoethyl ether acetate | 40 |
| (4) Ethylene glycol monomethyl ether | 50 |
|     Ethylene dichloride | 50 |
| (5) Butyl lactate | 75 |
|     Hexane | 25 |

It is apparent from the foregoing that the invention is of broad scope, and is not to be limited to the specific embodiments disclosed, or in any fashion excepting by the claims, in which it is my intention to cover all novelty inherent in this invention as broadly as possible, in view of prior art.

Having thus disclosed my invention, I claim:

1. A coating composition consisting essentially of a cellulose mixed ester derived from aliphatic acids having from 1–5 carbon atoms, said cellulose mixed ester having hydroxyl content of between 0.1 percent and 1.8 percent and from one percent to 49 percent of a substance selected from the group consisting of the film-forming resinous polymers of methacrylic acid, acrylic acid, and esters thereof as solutes, together with the solvent composition therefor, said solvent composition consisting essentially of from one to 75 percent of a solvent selected from the group consisting of aliphatic ketones and esters, toluene and nitro-aliphatic substances other than nitro-methane having a boiling range below 120° C.; 2 to 72 percent of a solvent selected from the class consisting of nitro-methane, aliphatic alcohol and lactates having less than 6 carbon atoms; and 14 to 97 percent of a substance selected from the group consisting of diacetone alcohol, lactates having from 5 to 10 carbon atoms, glycol ethers and glycol esters.

2. A coating composition consisting essentially of a cellulose mixed ester of aliphatic acids having from 1–5 carbon atoms, said cellulose mixed ester having hydroxyl content of between 0.1 percent and 1.8 percent, as solute, and the solvent composition therefor, said solvent composition consisting essentially of from one to 75 percent of a solvent selected from the group consisting of aliphatic ketones and esters, toluene and nitro-aliphatic substances other than nitro-methane having a boiling range below 120° C.; 2 to 75 percent of a solvent selected from the class consisting of nitromethane, aliphatic alcohol and lactates having less than 6 carbon atoms; and 14 to 97 percent of a substance selected from the group consisting of diacetone alcohol, lactates having from 5 to 10 carbon atoms, glycol ethers, and glycol esters.

3. A coating composition consisting essentially of cellulose acetyl butyrate having a hydroxyl content between 0.1 percent and 1.8 percent, as solute, and the solvent composition therefor, said solvent composition consisting essentially of from one to 75 percent of a solvent selected from the group consisting of aliphatic ketones and esters, toluene and nitro-aliphatic substances other than nitro-methane having a boiling range below 120° C.; 2 to 75 percent of a solvent selected from the class consisting of nitro-methane, aliphatic alcohol and lactates having less than 6 carbon atoms; and 14 to 97 percent of a substance selected from the group consisting of diacetone alcohol, lactates having from 5 to 10 carbon atoms, glycol ethers, and glycol esters.

References Cited in the file of this patent

UNITED STATES PATENTS

| 2,186,454 | Gloor | Jan. 9, 1940 |
| 2,292,393 | Mitchell | Aug. 11, 1942 |
| 2,628,923 | Yaeger | Feb. 17, 1953 |
| 2,702,255 | Yaeger | Feb. 15, 1955 |

OTHER REFERENCES

Reinhardt et al.: Ind. Eng. Chem., 32, pages 185–193, 1940.

Simmonds et al.: Handbook of Plastics, page 4, line 28, 1943.